United States Patent
Shizuka et al.

(10) Patent No.: US 12,106,089 B2
(45) Date of Patent: Oct. 1, 2024

(54) SOFTWARE UPDATING DEVICE, SOFTWARE UPDATING METHOD, AND SOFTWARE UPDATE PROCESSING PROGRAM

(71) Applicants: Nissan Motor Co., Ltd., Kanagawa (JP); RENAULT S.A.S., Boulogne-Billancourt (FR)

(72) Inventors: Yoshimori Shizuka, Kanangawa (JP); Eisuke Ohashi, Kanagawa (JP); Masayuki Motegi, Kanagawa (JP); Hidetoshi Hayashi, Kanagawa (JP); Mitsuhiko Kikuchi, Kanagawa (JP)

(73) Assignees: Nissan Motor Co., Ltd., Kanagawa (JP); RENAULT S.A.S., Boulogne-Billancourt (FR)

( * ) Notice: Subject to any disclaimer, the term of this patent is extended or adjusted under 35 U.S.C. 154(b) by 136 days.

(21) Appl. No.: 17/906,565

(22) PCT Filed: Mar. 15, 2021

(86) PCT No.: PCT/IB2021/000185
§ 371 (c)(1),
(2) Date: Sep. 16, 2022

(87) PCT Pub. No.: WO2021/186247
PCT Pub. Date: Sep. 23, 2021

(65) Prior Publication Data
US 2023/0138932 A1    May 4, 2023

(30) Foreign Application Priority Data
Mar. 18, 2020   (JP) .................. 2020-048340

(51) Int. Cl.
*G06F 9/445*  (2018.01)
*G06F 8/65*   (2018.01)
(Continued)

(52) U.S. Cl.
CPC ............ *G06F 8/65* (2013.01); *B60R 16/0231* (2013.01)

(58) Field of Classification Search
CPC ... G06F 8/65; G06F 8/71; G06F 8/656; G06F 8/60; G06F 9/44526; G06F 9/541;
(Continued)

(56) References Cited

U.S. PATENT DOCUMENTS 10,496,394 B2 * 12/2019 Frantz .................. H04W 4/44
11,479,254 B2 * 10/2022 Oda ...................... B60W 10/04
(Continued)

FOREIGN PATENT DOCUMENTS

| JP | 2007-011734 A | 1/2007 |
| JP | 2010-019175 A | 1/2010 |

(Continued)

OTHER PUBLICATIONS

Extended European Search Report issued in counterpart European Application No. 21771154.8 mailed on Jul. 17, 2023 (9 pages).

*Primary Examiner* — Thuy Dao
(74) *Attorney, Agent, or Firm* — Osha Bergman Watanabe & Burton LLP

(57) ABSTRACT

Provided is a software updating device for executing processing for updating software causing an equipment mounted on a vehicle to operate. The software updating device includes a controller that acquires the software, and controls the equipment by applying the software to the equipment. The controller includes a first storage unit that stores acquired first software and a second storage unit that stores acquired second software. In a state where no driving force is output by a power train of the vehicle, the controller executes processing for updating the software by changing software to be applied to the equipment from the first software to the second software.

5 Claims, 2 Drawing Sheets

(51) Int. Cl.
  *G06F 9/455* (2018.01)
  *H04L 9/30* (2006.01)
  *H04L 12/46* (2006.01)
  *H04L 67/00* (2022.01)
  *B60R 16/023* (2006.01)

(58) Field of Classification Search
  CPC ... G06F 9/451; G06F 9/54; G06F 8/61; B60R 16/0231; B60W 30/18036; B60W 30/18045; B60W 50/00; B60W 50/0098; B60W 20/15; B60W 30/18027; B60W 50/12; G07C 5/008; H04L 67/12; H04L 67/34; H04W 4/40
  See application file for complete search history.

(56) References Cited

U.S. PATENT DOCUMENTS

| | | |
|---|---|---|
| 2007/0005204 A1 | 1/2007 | Yamamoto et al. |
| 2018/0341476 A1 | 11/2018 | Kitao |
| 2019/0250902 A1 | 8/2019 | Tateishi |
| 2019/0265967 A1 | 8/2019 | Nakahara et al. |

FOREIGN PATENT DOCUMENTS

| | | |
|---|---|---|
| JP | 2018-200510 A | 12/2018 |
| WO | 2018/139296 A1 | 8/2018 |

* cited by examiner

SOFTWARE UPDATING DEVICE, SOFTWARE UPDATING METHOD, AND SOFTWARE UPDATE PROCESSING PROGRAM

TECHNICAL FIELD

The present invention relates to a software updating device, a software updating method, and a software update processing program.

BACKGROUND ART

Conventionally, updating the software of an ECU (Electronic Control Unit) mounted on a vehicle by wire essentially requires that the ECU is connected to an external battery during update processing in order to prevent dead battery due to reduction in battery voltage.

On the other hand, JP2010-19175A discloses a data writing system that identifies a vehicle whose ECU program (software) should be rewritten, by wireless communication, and performs transmission/reception of writing data and a writing work for them. This data writing system requires that an engine is in an operating state, as a precondition for enabling the writing of data, so as to prevent dead battery during the data writing work.

SUMMARY OF INVENTION

While the update of the software of the ECU is in progress, equipment to be controlled by the ECU is functionally stopped. Accordingly, like a technique disclosed in the patent literature 1, if the engine or the like is operating during the update of the software, an unexpected accident may occur, for example, in the case where the braking function is stopped. Therefore, it is necessary to stop the operation of a power train including the engine or the like during the update of the software so as to prevent the engine or the like from malfunctioning.

However, stopping the engine for a long time to update the software may lead to dead battery. Although it may be possible to update the software with an external battery being connected, equipment such as a high-power battery will be required to prevent the dead battery, which leads to reduction in convenience.

In view of the above problems, the present invention intends to provide a software updating device, a software updating method, and a software update processing program with improved convenience during update work while preventing malfunctions of an engine or the like during the update of software.

According to an aspect of this invention, there is provided a software updating device for executing processing for updating software causing an equipment mounted on a vehicle to operate. The software updating device includes a controller that acquires the software, and controls the equipment by applying the software to the equipment. The controller includes a first storage unit that stores acquired first software and a second storage unit that stores acquired second software. In a state where no driving force is output by a power train of the vehicle, the controller executes processing for updating the software by changing software to be applied to the equipment from the first software to the second software.

DESCRIPTION OF EMBODIMENTS

Hereinafter, an embodiment of the present invention will be described with reference to attached drawings.

Figure 1:
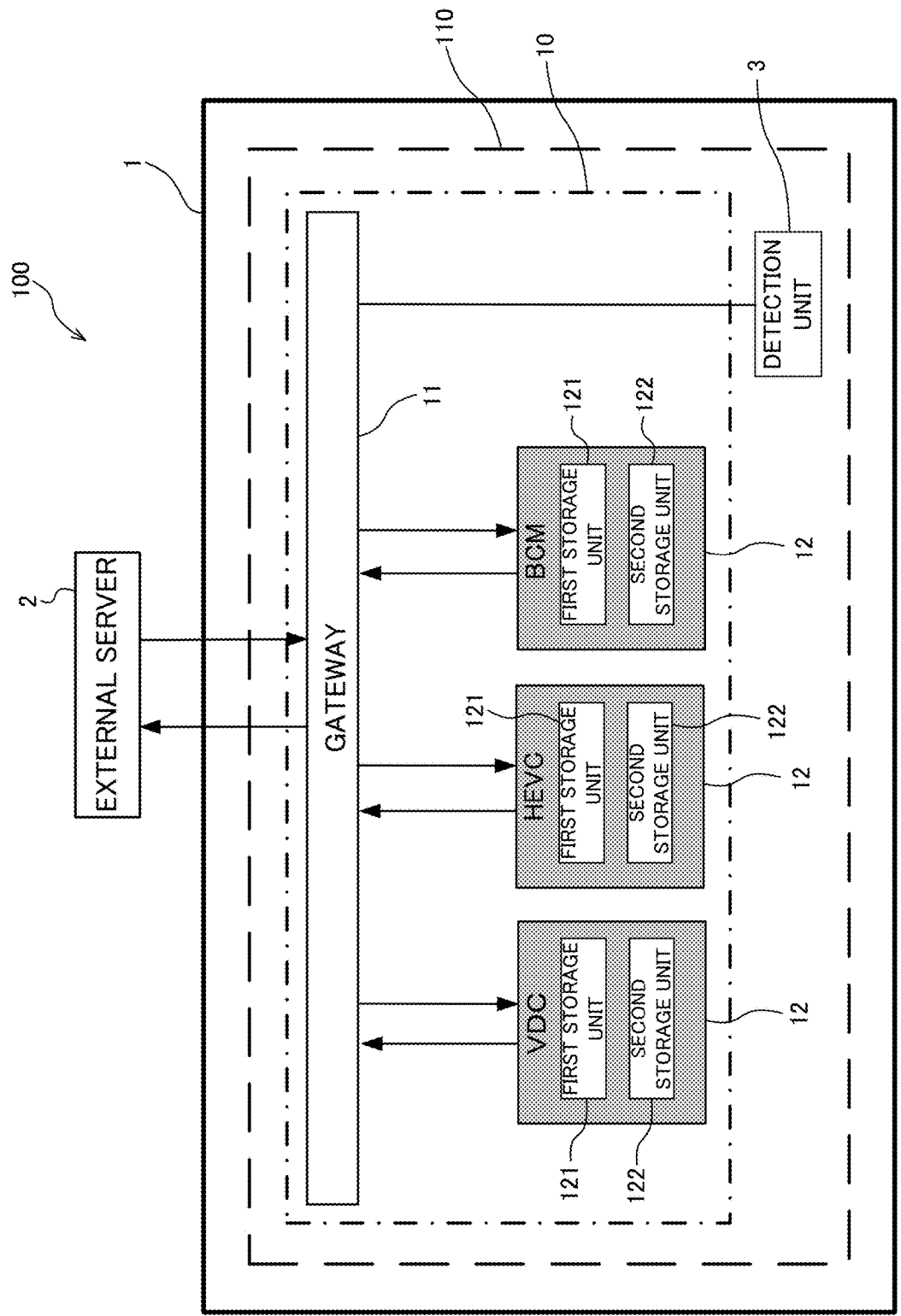
FIG. 1 is a schematic configuration diagram illustrating a software updating system according to an embodiment of the present invention.

An embodiment of the present invention will be described with reference to FIGS. 1 and 2. FIG. 1 is a schematic configuration diagram illustrating a software updating system 100 and a software updating device 110 according to the embodiment of the present invention.

As illustrated in FIG. 1, the software updating system 100 is configured by the software updating device 110 mounted on a vehicle 1, and an external server 2. The software updating device 110 is configured by a controller 10 and a detection unit 3.

The controller 10 includes a gateway 11 that acquires software from the external server 2, and an electronic control unit (ECU) 12 that controls each equipment mounted on the vehicle 1.

The gateway 11 can communicate with the external server 2 and the electronic control unit 12, acquires software for updating from the external server 2, and transmits the acquired software for updating to the electronic control unit 12 to be updated. Further, the gateway 11 acquires control information of each equipment from the electronic control unit 12, and acquires a driving force output state of a power train from the detection unit 3 described below.

The gateway 11 is configured by a computer including a central processing unit (CPU), a read-only memory (ROM), a random access memory (RAM) and an input/output interface (I/O interface), and performs integrated control for the software updating device 110. By executing a specific program, the gateway 11 executes processing for controlling the software updating device 110. The gateway 11 performs software update control described below, in cooperation with the electronic control unit 12, for example.

The electronic control unit (ECU) 12 is a controller that controls each equipment mounted on the vehicle 1. Examples of the electronic control unit 12 include BCM (Body Control Module), VDC (Vehicle Dynamics Control), and HEVC (Hybrid Electric Vehicle Control). Each electronic control unit 12 is configured by a computer including a central processing unit (CPU), a read-only memory (ROM), a random access memory (RAM), and an input/output interface (I/O interface). The BCM controls operating elements of a vehicle body of the vehicle 1, including an engine starter and door locks of the vehicle 1. The VDC controls respective brakes of the vehicle 1 and the output of an engine to control the posture of the vehicle 1, thereby preventing the vehicle 1 from skidding or the like. In the case where the vehicle 1 is a hybrid vehicle, the HEVC controls an engine and a motor, which are driving sources, so as to realize highly efficient driving.

The electronic control unit 12 can communicate with the gateway 11, and constantly transmits a signal representing control information of each equipment to the gateway 11. Each electronic control unit 12 acquires software including the specific program from the gateway 11, and controls the equipment to be controlled by applying the acquired software to the objective equipment. Further, the electronic control unit 12 performs the software update control described below in cooperation with the gateway 11.

Further, each electronic control unit 12 is provided with two storage units 121 and 122 that store the software acquired from the gateway 11, respectively. The electronic control unit 12 applies the software stored in one storage unit (first storage unit) 121 to the equipment. Further, the electronic control unit 12 updates the software by changing the software to be applied to the equipment to the software stored in the other storage unit (second storage unit) 122. Details of the software update processing will be described below.

The detection unit 3 includes a crank angle sensor, an accelerator pedal sensor, and the like that detect the driving of the engine, and detects the driving force output state of the power train of the vehicle 1. The driving force output state of the power train detected by the detection unit 3 is transmitted, as a signal, to the gateway 11.

Next, the software update processing will be described.

As mentioned above, each electronic control unit 12 is provided with two storage units 121 and 122. When acquiring software (first software) transmitted from the gateway 11, the electronic control unit 12 stores the software in one storage unit (first storage unit) 121. The electronic control unit 12 applies the software to the equipment. The first software may not be the one acquired from the gateway 11, but may be stored in advance in the first storage unit 121 in an initial state.

Next, when acquiring software for updating (second software) transmitted from the gateway 11, the electronic control unit 12 stores the software for updating in the other storage unit (second storage unit) 122. The first software is being applied to the equipment, while acquisition and storage of the second software by the electronic control unit 12.

As mentioned above, providing two storage units 121 and 122 in each electronic control unit 12 enables the electronic control unit 12 to acquire (download) and store (install) the software for updating, in the state where the first software is being applied to the equipment. That is, it is possible to acquire and store the software for updating without stopping the operation of the equipment to be controlled.

When completing the acquisition and storage of the software for updating (second software), the electronic control unit 12 changes the software to be applied to the equipment from the first software to the second software. As a result, the software to be applied to the equipment is updated. Hereinafter, the processing for changing the software to be applied to the equipment from the first software to the second software is referred to as software update processing (activation).

However, if the software update processing is executed in a state where the driving force by the power train including the engine or the like is being output, an unexpected accident may occur, for example, in the case where the braking function is stopped. Therefore, in the present embodiment, the software update processing is executed in a state where no driving force is output by the power train including the engine or the like.

Specifically, the gateway 11 executes the software update processing after the detection unit 3 detects the state where no driving force is output by the power train of the vehicle 1, and prohibits the output of the driving force by the power train during the software update processing. For example, when the detection unit 3 detects the off state of the engine where the engine speed is 0, the neutral (N) or parking (P) state of the transmission, and the like, the software update processing is started and the output of the driving force by the power train is prohibited. The output of the driving force by the power train is prohibited until the software update processing completes. When the activation is completed, the output of the driving force by the power train is permitted.

As mentioned above, since the software update processing is executed in the state where no driving force is output by the power train of the vehicle 1, the power train including the engine or the like can be prevented from malfunctioning during the activation. In addition, in the state where the first software is being applied to the equipment, the electronic control unit 12 acquires (downloads) and stores (installs) the software for updating, and the output of the driving force by the power train is prohibited only during the activation. That is, since the output of the driving force by the power train is permitted while the software for updating is acquired and stored by the electronic control unit 12, it is possible to acquire and store the software for updating while the vehicle 1 is traveling. Further, since the engine or the like can be operated during the acquisition and storage of the software for updating, the time during which the engine or the like is being stopped for updating the software can be shortened, compared with a case where the engine or the like is being stopped during the acquisition and storage of the software for updating. Accordingly, the dead battery during the update of software can be prevented.

It is not always required that the driving force output state of the power train of the vehicle 1 is detected by the detection unit 3. For example, the gateway 11 may be configured to be able to directly receive an ignition switch signal and detect the driving force output state of the power train, so that the detection unit 3 can be omitted.

Figure 2:
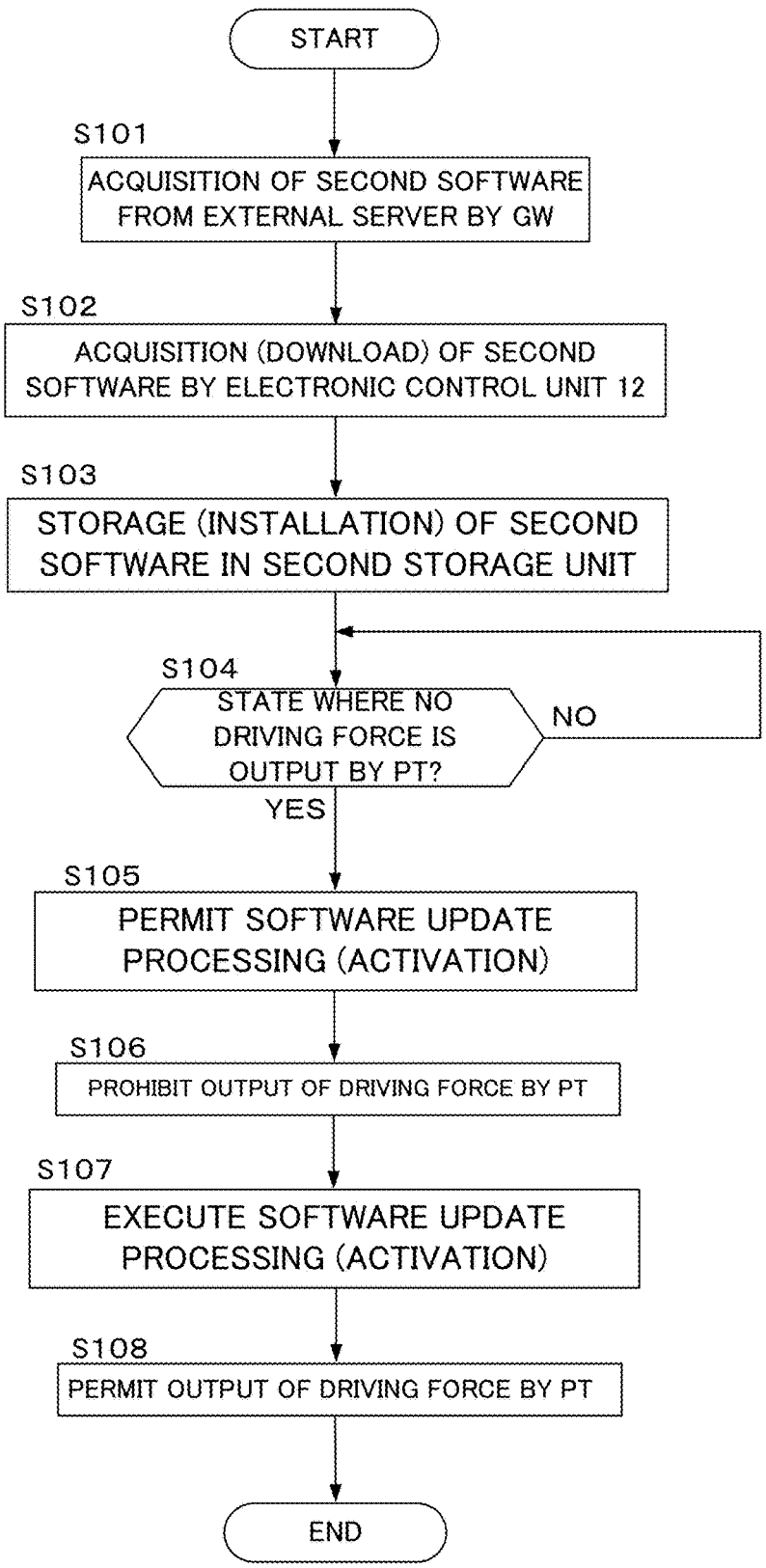
FIG. 2 is a flowchart illustrating a software update control according to an embodiment of the present invention.

FIG. 2 is a flowchart illustrating the software update control according to an embodiment of the present invention. All of the following controls can be executed by the controller 10 (the gateway 11, the electronic control unit 12). Further, it is assumed that the first storage unit 121 of the electronic control unit 12 stores the first software in the initial state and the first software is already being applied to the equipment to be controlled.

In step S101, upon acquiring the software for updating (second software) from the external server 2, the gateway (GW) 11 transmits the acquired software for updating to the electronic control unit 12 to be updated.

In step S102, the electronic control unit 12 acquires (downloads) the software for updating (second software) from the gateway 11.

Next, in step S103, the electronic control unit 12 stores (installs) the software for updating (second software) in the second storage unit 122. During the acquisition and storage of the second software in these steps S102 and S103, the first software is being applied to the equipment to be controlled by the electronic control unit 12. That is, the equipment including the engine or the like is not stopped during the acquisition and storage of the second software by the electronic control unit 12.

In step S104, the gateway 11 acquires the signal representing the driving force output state of the power train (PT) of the vehicle 1 detected by the detection unit 3, and executes processing of step S105 if no driving force is output by the power train. As mentioned above, the state where no driving force is output by the power train is, for example, the off state of the engine where the engine speed is 0 or the neutral (N) or parking (P) state of the transmission. On the other hand, in the state where the driving force is being output by the power train, the gateway 11 repeats the processing of step S104 until the output of the driving force from the power train is stopped.

In the state where the driving force is being output by the power train in step S104, if there is no problem even when the vehicle 1 stops the output of the driving force by the power train, the output of the driving force may be stopped.

For example, in the state where there is no problem even when the vehicle 1 stops the output of the driving force by the power train, the gateway 11 transmits a command for stopping the output of the driving force by the power train to the electronic control unit 12. Upon receiving the driving force output stop command, the electronic control unit 12 stops the output of the driving force by the power train. The state where there is no problem even when the output of the driving force by the power train is stopped can be determined, for example, by the gateway 11 based on the control information received from each electronic control unit 12.

In the state where no driving force is output by the power train, then in step S105, the gateway 11 permits the electronic control unit 12 to execute the software update processing (activation).

Subsequently, in step S106, the gateway 11 prohibits the output of the driving force by the power train.

In step S107, the electronic control unit 12 changes the software to be applied to the equipment controlled by the electronic control unit 12, which is a software update object, from the first software to the second software. As a result, the software to be applied to the equipment is updated from the first software to the second software. During the software update processing, it is desirable to notify the driver of the state where the update processing is in progress with a display unit or the like.

If the update of the software completes, then in step S108, the gateway 11 permits the output of the driving force by the power train.

As mentioned above, since the gateway 11 prohibits the output of the driving force by the power train while the software update processing is being executed, it is possible to more reliably prevent the power train including the engine or the like from malfunctioning during the activation.

Prohibiting the output of the driving force by the power train during the activation is desirable in order to more reliably prevent malfunctions of the power train, but it is not always limited to this. Since the software update processing in the present embodiment does not include acquisition and storage of the software for updating, the software update processing completes in a short period of time. Therefore, if the software update processing is started in the state where no driving force is output by the power train, it is unnecessary to intentionally perform the processing for prohibiting the output of the driving force by the power train during the activation. That is, the processing in steps S106 and S108 may be omitted.

In step S108, after permitting the output of the driving force by the power train, the gateway 11 terminates the software update control.

When the software is further updated next time, software for updating transmitted from the gateway 11 to the electronic control unit 12 is stored (overwritten) in the first storage unit 121. By changing the software to be applied to the equipment from the second software stored in the second storage unit 122 to the software for updating stored in the first storage unit 121, the software is reupdated.

The processing illustrated in FIG. 2 is configured as programs that cause the controller 10 being a computer to execute processing, and these programs are described in a storage medium.

The software updating device 110 of the above-described embodiment brings the following effects.

In the software updating device 110, the electronic control unit 12 (the controller 10) has the first storage unit 121 that stores the first software and the second storage unit 122 that stores the second software. Therefore, in the state where the first software stored in the first storage unit 121 is being applied to the equipment, it is possible to acquire the software for updating (second software) and store it in the second storage unit 122. Therefore, even while the vehicle 1 is traveling, it is possible to acquire and store the software for updating. On the other hand, the controller 10 executes the software update processing in the state where no driving force is output by the power train of the vehicle 1. As mentioned above, the vehicle 1 can travel during the acquisition and storage of the software for updating, meanwhile the software update processing is executed in the state where no driving force is output by the power train of the vehicle 1. Accordingly, it is possible to provide the software updating device 110 with improved convenience during the update work while preventing malfunctions of the engine or the like during the update of software.

Further, since it is possible to acquire and store the software for updating in the state where the first software stored in the first storage unit 121 is being applied to the equipment, it is sufficient to stop the output of the driving force by the power train including the engine or the like only during the activation. That is, since the engine or the like can be operated during the acquisition and storage of the software for updating, the time during which the engine or the like is being stopped for updating the software can be shortened, compared with a case where the engine or the like is being stopped during the acquisition and storage of the software for updating. Accordingly, the dead battery during the update of software can be prevented.

In the software updating device 110, when the detection unit 3 detects the state where no driving force is output by the power train of the vehicle 1, the controller 10 permits the execution of the software update processing. As mentioned above, since the execution of the software update processing is permitted after the detection of the state where no driving force is output by the power train, it is possible to more reliably prevent the engine or the like from malfunction during the update of software.

In the software updating device 110, the controller 10 prohibits the output of the driving force by the power train of the vehicle 1 while the software update processing (activation) is being executed. As a result, it is possible to more reliably prevent the power train including the engine or the like from malfunctioning during the activation.

In the software updating device 110, the controller 10 prohibits the output of the driving force by the power train of the vehicle 1 while the software update processing (activation) is being executed, and permits the output of the driving force by the power train when the update processing is completed. As mentioned above, since the output of the driving force by the power train is prohibited only during the activation, the time during which the engine or the like is being stopped for updating the software can be shortened. Accordingly, the dead battery during the update of software can be prevented.

Further, the electronic control unit (ECU) 12 has been exemplarily described as BCM, VDC, and HEVC in the present embodiment, the electronic control unit 12 is not limited in type to them, as long as it can control the equipment mounted on the vehicle 1. The number of them is not limited to the above example.

Further, the software update control including the software update processing of the present embodiment may be executed simultaneously for a plurality of electronic control units 12 or may be executed for each electronic control unit 12 at a different time.

Further, in the present embodiment, the gateway 11 is configured to execute the integrated control for the software updating device 110 and the electronic control unit 12 is configured to execute the control of each equipment mounted on the vehicle 1, but the main entity of each control may be either the gateway 11 or the electronic control unit 12. For example, the electronic control unit 12 may be configured to directly execute the prohibition of the output of the driving force by the power train during the activation, without any command of the gateway 11. Further, the gateway 11 may execute the change of the software to be applied to the equipment (the software update processing), instead of the electronic control unit 12.

Although some embodiments of the present invention have been described above, the above description of the embodiments is only a part of application examples of the present invention and does not intend to limit the technical scope of the present invention to specific configurations of the above embodiments.

The present application claims a priority of Japanese Patent Application No. 2020-048340 filed with the Japan Patent Office on Mar. 18, 2020, and all the contents of which are hereby incorporated by reference.

The invention claimed is:

1. A software updating device for executing processing for updating software causing equipment mounted on a vehicle to operate, wherein
the equipment includes a power train of the vehicle,
the software updating device includes:
a hardware detection unit that detects a driving force output state of the power train of the vehicle; and
a hardware controller that acquires the software, and controls the equipment by applying the software to the equipment,
the hardware controller includes:
a first storage unit that stores acquired first software; and
a second storage unit that stores acquired second software,
when the hardware detection unit detects a state where no driving force is output by the power train of the vehicle, the hardware controller executes processing for updating the software by changing software to be applied to the equipment from the first software to the second software in the state where no driving force is output by the power train of the vehicle, and
the hardware controller prohibits outputting the driving force by the power train of the vehicle while the processing for updating the software is being executed.

2. The software updating device according to claim 1, wherein when the processing for updating the software is completed, the hardware controller permits outputting the driving force by the power train of the vehicle.

3. The software updating device of claim 1, wherein the hardware detection unit, to detect the driving force output state, comprises at least one of:

a transmission state sensor that indicates a state of a transmission of the equipment;
an ignition switch sensor that indicates a state of an engine of the equipment;
a crank angle sensor; and
an accelerator pedal sensor.

4. A method for updating software causing equipment mounted on a vehicle to operate using a software updating device, wherein
the equipment includes a power train of the vehicle,
the software updating device comprises a hardware detection unit that detects a driving force output state of the power train of the vehicle,
the method for updating the software includes:
applying first software stored in a first storage unit to the equipment;
acquiring second software and storing the second software in a second storage unit;
detecting, with the software updating device, the driving force output state of the power train of the vehicle; and
executing processing for updating the software, when a state where no driving force is output by the power train of the vehicle is detected, by changing software to be applied to the equipment from the first software to the second software in the state where no driving force is output by the power train of the vehicle, and
outputting of the driving force by the power train of the vehicle is prohibited while the processing for updating the software is being executed.

5. A software update processing program stored in a non-transitory computer-readable medium for realizing processing for updating software causing equipment mounted on a vehicle to operate, wherein
the equipment includes a power train of the vehicle, and
the software update processing program causes a hardware controller to realize:
applying first software stored in a first storage unit to the equipment;
acquiring second software and storing the second software in a second storage unit;
detecting a driving force output state of the power train of the vehicle;
executing processing for updating the software, when a state where no driving force is output by the power train of the vehicle is detected, by changing software to be applied to the equipment from the first software to the second software, in the state where no driving force is output by the power train of the vehicle; and
prohibiting outputting the driving force by the power train of the vehicle while the processing for updating the software is being executed.

* * * * *